Oct. 21, 1947.    L. A. TROFIMOV    2,429,570
POWER APPARATUS FOR DRIVING LOADS AT CONSTANT SPEED
Filed June 6, 1942    4 Sheets-Sheet 2

INVENTOR.
Lev A. Trofimov
BY
Harry P. Canfield
ATTORNEY

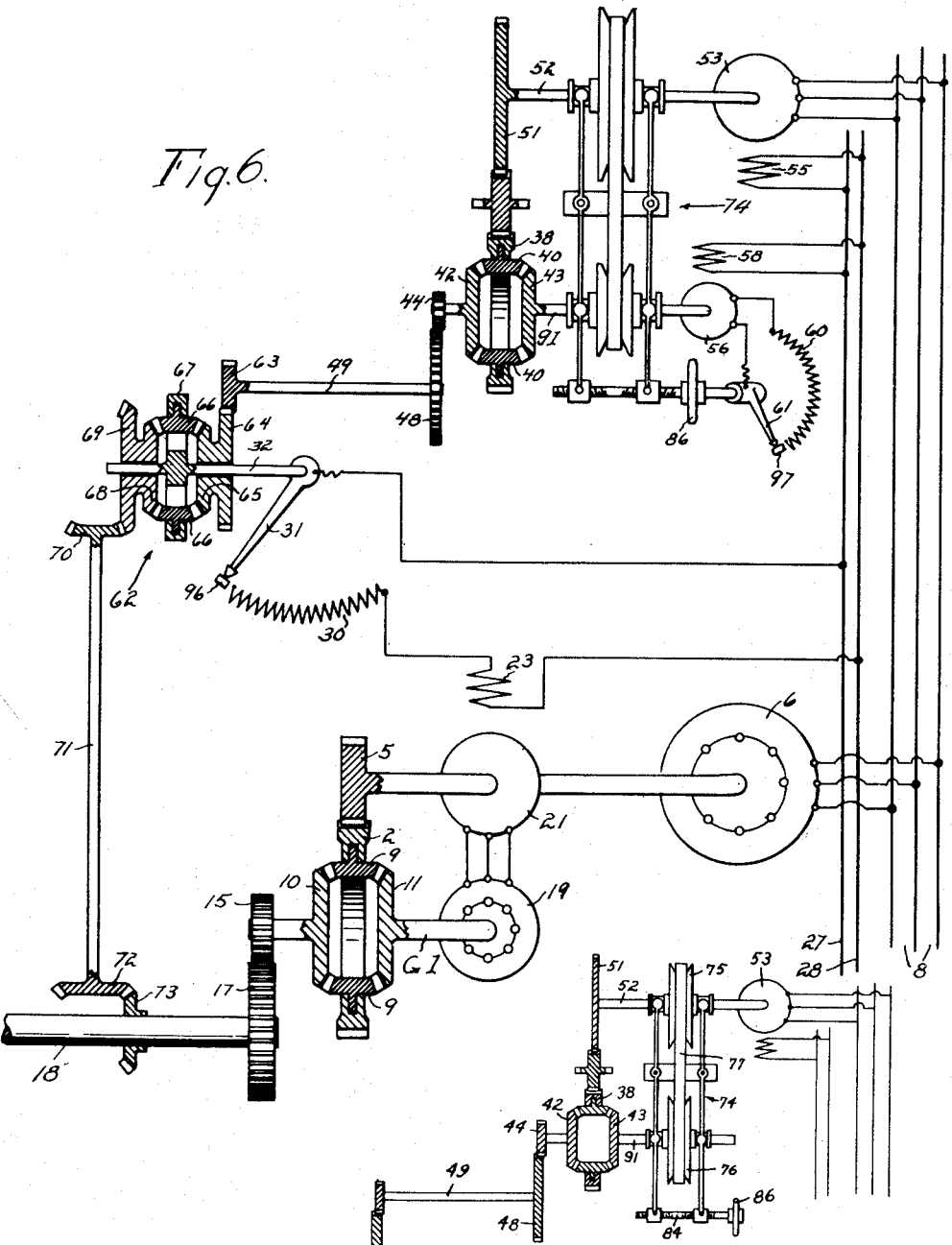

Patented Oct. 21, 1947

2,429,570

UNITED STATES PATENT OFFICE 2,429,570

POWER APPARATUS FOR DRIVING LOADS AT CONSTANT SPEED

Lev A. Trofimov, Willoughby, Ohio

Application June 6, 1942, Serial No. 446,084

8 Claims. (Cl. 172—239)

This invention relates to power-supplying apparatus for supplying mechanical power to drive a load.

More particularly the invention relates to apparatus by which rotary power may be supplied to a driven load to drive it at a pre-selected speed and with negligibly small deviation from the selected speed even when the load varies over a wide range; and by which the selected speed may be adjustably varied over a wide range of speeds, including zero speed, and by which the selected load speed may be in either the forward or the reverse direction.

The invention may be variously embodied in apparatus; but in the several forms and modifications of its embodiment which have been chosen for illustration and description herein, it comprises in general a constantly running rotary power source; mechanism, preferably differential gearing, through which power from the source is transmitted to the load and through which power is also transmitted or diverted to a load speed controlling apparatus; the load speed controlling apparatus being actuated by an adjustable speed determining and regulating apparatus; and preferably although not necessarily, the said diverted power being recovered and returned to the power source.

As will appear hereinafter the invention may be embodied in a power supplying apparatus as a unit of which the power source is an element in which case it may be properly considered as a power supplying unit; or it may be considered as a power transmission unit through which power to the load is transmitted from a power source.

It is among the objects of the invention:

To provide generally an improved power-supplying apparatus for driving loads;

To provide an improved apparatus for driving variable loads at substantially constant speed;

To provide an improved apparatus for driving variable loads at substantially constant speed in either the forward or the reverse direction;

To provide an improved apparatus for driving variable loads by power at substantially constant speed in either the forward or the reverse direction and which constant speed may be adjusted in an improved manner in either direction;

To provide an improved apparatus for driving a load and for controlling the speed of the load;

To provide an improved apparatus for driving a load and controlling the speed and direction of the load.

Other objects will be apparent to those skilled in the art to which my invention appertains.

My invention is fully disclosed in the following description taken in connection with the accompanying drawing in which, Fig. 1 is a diagrammatic view illustrating an embodiment of my invention for driving a load at constant adjustable speed in either the forward or the reverse direction;

Fig. 6 is a view similar to Fig. 1 but illustrating a simplification of the embodiment of Fig. 1 which may be employed when the load is to be driven only in one direction;

Fig. 7 is a view illustrating a part of the embodiment of Fig. 1 and illustrating a simplification which may be employed.

Figure 1:
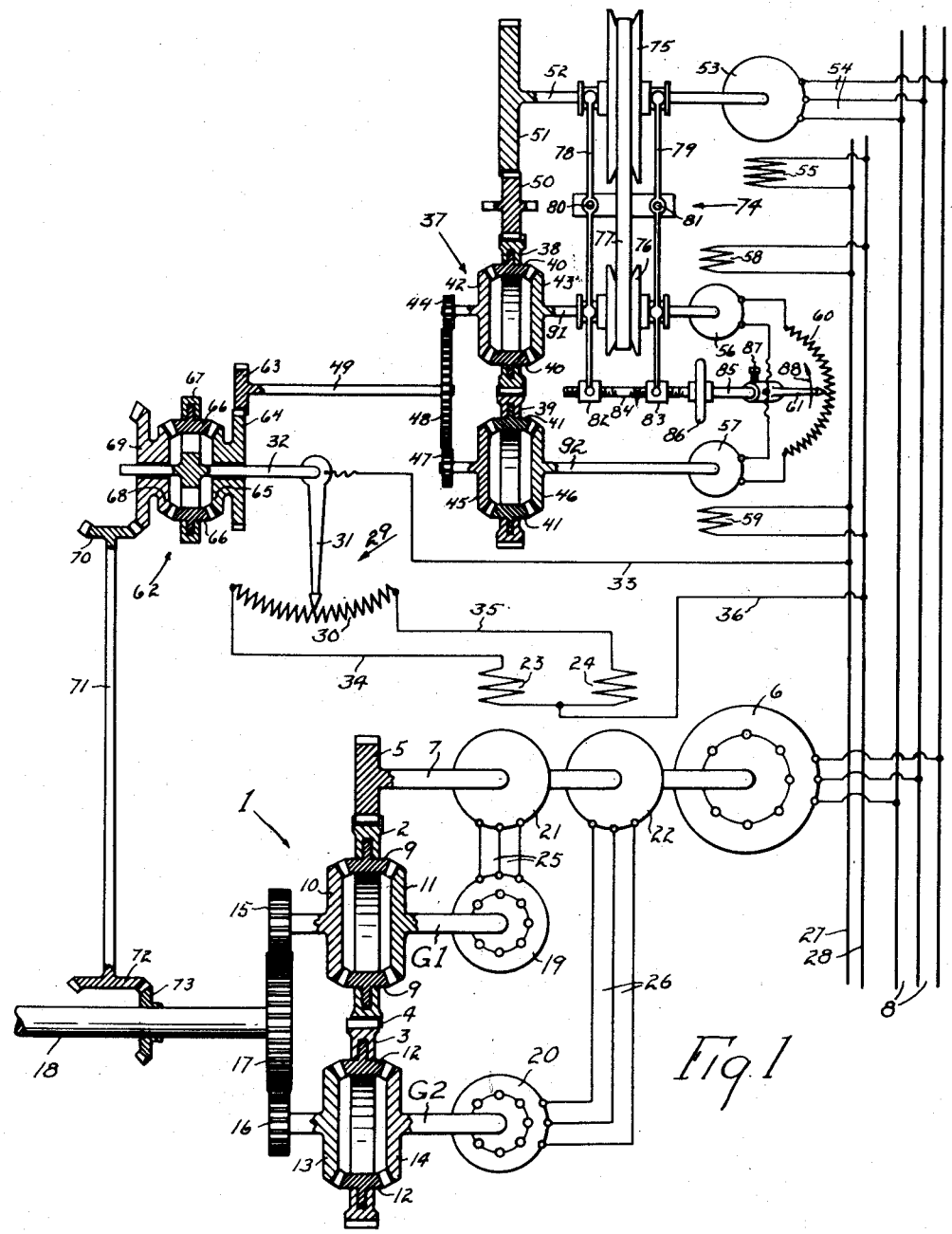

Referring now to Fig. 1 of the drawing which illustrates an embodiment of my invention for driving a load at adjustable constant speed in either the forward or the reverse direction, at any selected speed from zero speed to a maximum speed in either direction I have shown generally at 1, a double differential gearing mechanism comprising a pair of spiders 2 and 3 rotatably driven in opposite directions and this is conveniently effected by providing gear teeth on their peripheries and meshing the teeth together as at 4 and by driving one of the spiders, say the spider 2, by a gear 5 meshed therewith and which in turn is driven by a power source 6 having a shaft 7 connected to the gear 5.

The power source 6 may be any kind of a motor such as an electric motor, alternating or direct current, or an internal combustion or other engine, and, as an example, I have chosen to illustrate it in Fig. 1 as a squirrel cage induction motor connected to three phase alternating current supply mains 8. While it is preferred to utilize a power source motor which runs at substantially constant speed, nevertheless any variations in the speed of the power source utilized which might tend to change the speed of the load are automatically compensated for in the apparatus to be described so that power source speed variations do not vary the load speed.

The differential spider 2 rotatably supports pinions 9—9 with which are meshed differential gears 10 and 11; and the spider 3 similarly rotatably supports pinions 12—12 with which are meshed differential gears 13 and 14.

The differential gears 10 and 13 are connected respectively to gears 15 and 16 both of which are meshed with a gear 17 connected to a load driving shaft 18 which may be connected to a load, not shown. The differential gears 11 and 14 are connected respectively to shafts G1 and G2.

For convenience of description, the sets of gears, namely: the two spiders 2 and 3; and the four differential gears 10, 11, 13, 14; and the pinions 9, 12; and the gears 15, 16; are shown as of a like diameter in each set.

With the arrangement shown and above described, it will be observed that if the shafts G1 and G2 are caused or allowed to rotate at the same speed and in opposite directions, the load shaft 18 will remain at rest; and that if the shaft G1 rotates slower than the shaft G2, the load shaft 18 will rotate in one direction, say, the forward direction; and if the shaft G2 rotates slower than the shaft G1, the load shaft 18 will rotate in the other or reverse direction; and that therefore the speed of the load shaft 18 in either direction will be controlled by the respective speeds of the shafts G1 and G2.

In this connection, it may be added that, due to the gear interconnections described, there is always a definite relation between the speeds of the oppositely rotating shafts G1 and G2, that is, for any speed of one of the shafts, say the shaft G1, there is a definite speed at which the other shaft G2 must run, and correspondingly a definite speed at which the load shaft 18 will run; and if the shaft G1 slows down, the shaft G2 speeds up; and this relation is such that the arithmetical sum of the respective speeds of the shafts G1 and G2, is a constant.

In order to control the respective speeds of the shafts G1 and G2 to make them equal or different, to correspondingly cause the load shaft to remain at rest or to rotate in one direction or the other, the shafts G1 and G2 are connected respectively to electric generators 19 and 20, and the electrical loads of these generators are controlled.

With the differential gearing arrangement shown, the torque supplied to the spider 2 will divide equally between the gear 15 and the shaft G1. Thus torque will be developed at the gear 15 in accordance with the development of torque at the shaft G1; and similarly for the gear 16 and the shaft G2; and thus the end result contemplated by this invention is most conveniently developed by a type of generator the electrical load and torque to drive which may be conveniently varied over a wide range.

In the form of Fig. 1 the generators 19 and 20 are for this reason preferably alternating current induction generators energized and operating as will presently be disclosed; and furthermore in the embodiment of Fig. 1, the power diverted through the differential gearing to drive the generators 19 and 20 is not lost in the system but is transmitted back to the shaft 7 and thence to the spiders 2 and 3. This and the advantages thereof will now be described.

Mounted on the shaft 7 of the motor 6, are the rotors of a pair of electrodynamic units 21 and 22 having the general construction of alternating current synchronous motors, the direct current field windings thereof being shown at 23 and 24.

The generators 19 and 20 have the general construction of squirrel cage induction motors, the squirrel cage rotors of which are connected to the shafts G1 and G2 respectively; and the rotary magnetic fields of which are produced by windings connected respectively by three phase circuits 25 and 26 to the alternating current rotors of the units 21 and 22.

In general terms, if the multiphase stator of a squirrel cage induction motor has three phase alternating current supplied thereto, for example by the circuit 25 of Fig. 1, a rotating magnetic field is produced in its stator; and if the squirrel cage rotor of the motor be driven at a speed greater than that of the rotating field, the motor will act as a generator and supply current back through the circuit 25.

This generator principle is utilized in the embodiment of Fig. 1. The units 21 and 22 operate as exciting generators for the induction generators 19 and 20. When the direct current fields 23 and 24 are energized, the units 21 and 22 generate three phase alternating current in the circuits 25 and 26 to excite the generators 19 and 20. The generators 19 and 20 generate current and supply it back through the circuits 25 and 26 to the units 21 and 22 operating them as synchronous motors; and the electrical power thus supplied thereto is converted thereby into mechanical power and applied to the shaft 7 in the same direction in which it is being driven by the power source motor 6. The units 21 and 22 acting as exciting generators for the induction generators 19 and 20 establish, for the latter, rotating fields rotating at a number of revolutions per minute determined by the speed of rotation and the number of poles of the units 21 and 22 and the stator winding arrangement of the generators; and this is predetermined, in a manner which will be well understood by those skilled in the art, so that the revolutions per minute at which the induction generators' squirrel cage rotors are driven by their shafts G1 and G2 will be greater than the revolutions per minute of their rotating fields, and in the same direction as the rotating fields; and preferably also so that when the load shaft 18 is at rest and the shafts G1 and G2 are rotating at equal speeds, the speeds of the induction generator rotors will be twice that of the speeds of the induction generator rotating fields. Thus throughout a wide range of speeds for the load shaft 18, the generator 19 or 20 which is rotating at the lower speed, will still be rotating faster than the rotation of the magnetism in its stator, and acting as a generator.

With the arrangement described and as illustrated in Fig. 1, to vary the electrical load of the induction generators 19 and 20 relatively, to cause one shaft G1 or G2 to rotate slower than the other, it is only necessary to vary relatively the energization of the direct current fields 23 and 24 of the units 21 and 22; and this is done by a controller now to be described, and of which the windings 23 and 24 are a part.

As is now believed to be clear, there is a degree of energization for the windings 23 and 24, at which the generators 19 and 20 have equal loads, and the load shaft 18 remains at rest; and when the relative energizations of the windings 23 and 24 is changed, the generator loads become unbalanced and the load shaft 18 rotates in one direction or the other (depending upon which field energization is made the stronger) and at a speed commensurable with the amount of the difference of the energization of the fields 23 and 24. (Preferably the windings 23 and 24 are alike or produce equal magnetic effects for the same degree of energization, and the units 21 and 22 are identical, and the induction generators 19 and 20 are identical.)

In brief, the windings 23 and 24 are energized from direct current supply mains 27 and 28 through a rheostat shown generally at 29 comprising a resistor 30 and a rotary rheostat arm 31 connected to and rotatable with a shaft 32. Current from the main 27 flows by a wire 33 to the rheostat arm 31 and thence to an intermediate point on the resistor 30 and there divides part flowing by a wire 34 to the field winding 23 and part by wire 35 to the field winding 24 and thence by a common wire 36 to the other supply main 28.

With the rheostat arm 31 in a middle position the two fields 23 and 24 will be equally energized and when the rheostat arm is moved in one direction or the other, it introduces more resistance in the circuit of one winding and cuts out resistance from the circuit of the other winding and thereby energizes them to unbalanced degrees for the purposes described.

From this it will be clear that, corresponding to the rotated position of the arm 31, the load shaft 18 will remain at rest, or rotate in one direction or the other, and that both the direction of rotation and the speed thereof will be determined by the position of the arm 31, and the means for positioning the arm will presently be described.

When the load is at rest or at low speed, the generators, in general, are driven at high speed and develop great torque, and as the load shaft speeds up, say by acceleration, the generators develop less torque; as mentioned, the torque of the source motor 6 divides in general between the load shaft 18 and the generators 19 and 20; thus the load is driven at high torque at low speeds and lower torque at higher speeds so that the load shaft is supplied, in general, with constant horsepower at all speeds. Also, since the power delivered to the generators 19 and 20 is given back by them to the source, and therefore the generators do not change the total power supplied from the source motor to the load, the continuously running power source motor operates at constant horsepower, and therefore at maximum efficiency at all load speeds for any given load.

At 37 is illustrated another double differential mechanism which in some respects is similar to the mechanism 1 described above, but whereas the mechanism 1 and associated parts is of relatively large size for transmitting to the load shaft 18 the power of a large motor 6 (and which might in some cases be rated in thousands of horsepower when the motor 6 is for example a Diesel engine) the mechanism 37 is of small or fractional horsepower size since the power which it supplies as will presently appear is only enough to effect speed regulating by operation of the speed determining rheostat arm 31. It comprises two differential spiders 38 and 39 geared to each other, and carrying respectively pinions 40—40 and 41—41; differential gears 42 and 43 meshed with the pinions 40, and connected respectively to a gear 44 and a shaft g1; and differential gears 45 and 46 meshed with the pinions 41 and connected respectively to a gear 47 and a shaft g2; and the gears 44 and 47 being meshed with a gear 48 connected to a shaft 49 which may be considered as a regulating load shaft.

The spiders 38 and 39 are geared together to run in opposite directions and are both driven through an idler 50 by a gear 51 on the shaft 52 of a small or fractional horsepower motor 53, which in the embodiment illustrated is a synchronous alternating current motor the rotor of which is connected by three phase wires 54 to the three phase supply wires 8, and the direct current field 55 of which is connected to the direct current supply mains 27 and 28. A synchronous motor is preferred for its constant speed characteristic.

The shafts g1 and g2 have electric generators 56 and 57 connected thereto to be driven thereby, and in the embodiment illustrated these are for simplicity single phase alternating current generators having fields 58 and 59 energized from the direct current supply mains 27 and 28.

The loads of the generators 56 and 57 when varied relatively, control the speeds of the shafts g1 and g2 to cause the regulating load shaft 49 to remain at rest, or rotate in one direction or the other, as was described in connection with the shaft 18 of the main power apparatus 1, and this is done by means of a rheostat comprising a resistor 60 and an arm 61, the generator 56 having a load circuit from one terminal through a part of the resistor 60 and by the arm 61 back to the other terminal, and the generator 57 having a similar load circuit through the other part of the resistor 60. Obviously with the rheostat arm 61 in a middle position the loads are equal, and when it is moved in one direction or the other they become unequal.

Thus power to drive the regulating shaft 49 is derived from the motor 53, and the shaft 49 remains at rest or rotates in one direction or the other, its speed and direction both being determined by the position of the rheostat arm 61.

In the above given description of the power arrangement designated at 1, the load developed in the generators 19 and 20 was transmitted back to the shaft of the main motor 6 to conserve and not waste the power developed in the generators 19 and 20. Identically the same arrangement could be employed in the arrangement at 37, but inasmuch as this can be a very small or fractional horsepower arrangement, it is thought that in practice the saving of power would not warrant the greater complication.

The regulating load shaft 49 operates through a differential gearing shown in general at 62. It is connected to a gear 63 meshed with a gear 64, connected to or constituting part of a differential gear 65 which latter is meshed with differential pinions 66—66 rotatably mounted upon a differential spider 67. The pinions 66—66 are also meshed with a differential gear 68 connected to or constituting part of a gear 69. The gear 69 is meshed with a gear 70 connected by a shaft 71 with a gear 72 meshed with a gear 73 mounted on (or driven by) the load shaft 18. The spider 67 is connected by the aforesaid rheostat shaft 32 to the rheostat arm 31.

At 74 is shown a variable speed-ratio transmission device which in the embodiment illustrated is of the two cone-pulley and belt type and comprising a cone pulley 75 on the shaft 52 and another cone pulley 76 on the shaft g1, the two cone pulleys being connected by a belt 77. This mechanism is illustrated diagrammatically in the drawing but will be recognized by those skilled in the art as a Reeves type transmission, and in the diagrammatic showing it comprises a pair of levers 78 and 79 pivotally supported at 80 and 81 and associated with the cone pulleys 75 and 76 so that by rocking the levers around their pivots the relative diameters of the cone pulleys will be changed to change the transmission ratio.

At the lower ends of the levers 78 and 79 are nuts 82 and 83 on a reversely threaded screw 84 which continues toward the right, as viewed in the drawing, and becomes a shaft 85 connected to the aforesaid rheostat arm 61 to rotate it over the resistor 60. A wheel handle 86 is provided on the shaft 85 to turn it.

By this means when the wheel 86 is turned, the speed ratio of the transmission from the shaft 52 through the belt 77 to the shaft g1 is adjustably varied; and concurrently therewith the resistance of the resistor 60 is varied. The operation as a whole of the apparatus above described will now be given.

In order to make the description simple, it will be assumed to start with that the rheostat arm 31 is in an intermediate position at which the fields 23 and 24 are equally energized and the generators 19 and 20 have equal loads and the shafts G1 and G2 accordingly rotate at equal speeds, and the load shaft 18 is accordingly at rest; and that the rheostat arm 61 is in an intermediate position at which the generators 56 and 57 are equally loaded and the shafts g1 and g2 rotate at equal speeds and the regulating shaft 49 is at rest.

In the mechanism at 37 the gear 51 has been chosen for convenience as of the same diameter as the spider 38 and under this condition the shaft 81 will be rotating at twice the speed of the shaft 52; and for this reason the cone pulley 75 is shown adjusted to be twice the size of the cone pulley 76, and this may be considered as the normal condition of the adjustable speed-ratio transmission 74, and the parts may adjustably be brought to the normal condition here considered by loosening the set screw 87 which attaches the rheostat arm 61 to the shaft 85 moving the rheostat arm to its middle position, turning the wheel 86 until the arms 78 and 79 of the device 74 are in said pulley ratio positions, and then setting the set screw 87.

It will be understood that at this time, notwithstanding that the output shafts 49 and 18 are at rest, the power supplying motors 53 and 6 respectively are running at full speed.

To cause the load shaft 18 to be driven, say in the forward direction, and to attain some desired speed and continue to be driven at that speed, the hand wheel 86 is rotated to rotate the rheostat arm 61, say in the direction of the arrow 88. This will cause the generator 56 to have a greater load than the generator 57 and cause the shaft g1 to rotate slower than the shaft g2 and the shaft 49 will therefore turn in a corresponding direction. This will turn the gear 64—65, and, the gear 68—69 being at rest because the shaft 18 is at rest, the spider 67 will rotate and move the rheostat arm 31 on the resistor 30 to unbalance the fields 23 and 24 and unbalance the loads on the generators 19 and 20, and this will cause the load shaft 18 to start to turn. The rheostat arm 31 at this time is continuing to move farther and farther around over the resistor 30 unbalancing the fields 23 and 24 more and more and causing the shaft 18 to rotate faster and faster.

The rotation of the rheostat shaft 32 by the spider 67 was effected because the differential gear 68 was at rest, and the differential gear 65 was rotating. When the shaft 18 begins to turn however and transmits its movement through the gear shaft 71 to the differential gear 68 and rotates it, rotation of the spider 67 slows down, and the rheostat arm 31 slows down, so that as the shaft 18 speeds up it tends to restore the arm 31, and it approaches and finally attains a speed at which the rheostat arm 31 stops moving and comes to rest with a certain amount of imbalance of the fields 23 and 24, so that the shaft 18 continues to rotate at that speed, corresponding to the final and rest position of the rheostat arm 31, this following from the fact that the differential gear 68 attains the speed of the differential gear 65 the rotation of the gears 68 and 65 and their associated parts neutralizing each other, and the spider 67 comes to rest.

Obviously the bevel gears 69, 70, 72 and 73 are arranged so that the differential gear 68 is driven in the direction opposite to that of the differential gear 65.

Thus the main load shaft 18 comes up to a definite selected speed even if it be delivering enormous power, merely by selecting the position of the small rheostat arm 61 of the mechanism 37 by the hand wheel 86.

The motor 53 and its shaft 52 run substantially at constant speed, as constant as the frequency of the mains 8, and since shaft g1 is connected thereto positively through the belt 77, the shaft g1 will rotate at an invariable speed; and since the shafts g1 and g2 always run at speeds the arithmetical sum of which is constant, the shaft 49 will always run at a speed determined by the relative speeds of the shafts g1 and g2, which is fixed by the device 74. The difference between the speeds of the shafts g1 and g2 to cause the shaft 49 to turn as described may be effected primarily by producing a difference in the loads of the generators 56 and 57 by the rheostat arm 61; so that the device 74 need transmit but very little power through the belt 77. The shaft g1 tends to run, by generator load adjustment, at the same speed at which the device 74 is adjusted to drive it; and both adjustments are made concurrently. The device 74 thus maintains the shaft g1 accurately at the speed determined for it by the change of generator loads, and prevents any small variation of speed which might occur due to slight variations in load on the shaft 49 or slight variations of the speed of the generators 56 and 57 which might occur from any cause. The speed of the shaft 49, therefore, is caused to be constant for any adjustment thereof for the end result mentioned above; and the device 74, since it transmits very little power can be of exceedingly small size and horsepower rating.

In this connection it will be understood that as the hand wheel 86 is turned to change the speed at which the shaft g1 (and therefore the shaft g2) tends to be driven through the transmission 74 by the shaft 52, the concurrent movement of the rheostat arm 61 changes the relative loads of the generators 56 and 57 to cause the shafts g1 and g2 to tend to rotate at these same relative speeds, whereby the device 74 is more of a speed regulating than a speed determining device. The contact points on the resistor 60 and the amounts of resistance between successive points will be accordingly predetermined as will be understood.

Now it is a feature of my invention that the speed attained by the load shaft 18 will be maintained with no deviation therefrom (or at most with a negligible range of deviation) even if the load on the shaft 18 should vary. Even without the device 74 if the load on the shaft 18 should vary, say increase, the following action takes place. In the mechanism 1, as was mentioned and as can be demonstrated, the power supplied to the load shaft 18 is in general constant horsepower, the power delivered to the shaft 18 being at high torque when it is at low speed and at lesser torque when it is at high speed, and thus an increase of load on the load shaft 18 after it has come up to speed will tend momentarily to slow it down; but any slight reduction in the speed of the load shaft 18, acting through the differential mechanism 62 immediately causes the rheostat arm 31 to be moved from its regulated load-speed position to a position corresponding to a higher speed. The load shaft 18 will then immediately return to its regulated or selected speed, and leave the arm 31 in a new regulated position corresponding to that speed, so that the mechanism tends inherently to correct itself for variations of load, and maintain a constant load speed for the shaft 18 by immediately returning the speed of the shaft 18 to the speed from which it momentarily deviated due to change of load. The shaft 18 is furthermore returned quickly to its selected speed by the action of the motors 21 and 22 and generators 19 and 20 above described by which upon any decrease of speed of the shaft 18 the torque given thereto rises, and vice versa.

Such correcting action at the rheostat arm shaft 32 reacts upon the differential gear 64—65 and the regulating shaft 49 and therefore varies the load on the shaft 49, which tends to vary its speed, which in turn tends to vary the regulated speed of the main load shaft effected by the speed of the shaft 49 itself. But by introducing the device 74, such variation of speed of the shaft 49 is completely prevented and the regulated speed for the shaft 18 is maintained fixed at its adjusted value, even for a mechanism 37 of exceedingly small size and power.

The Reeves type of drive 74 has been illustrated in the drawing to simplify the disclosure and a Reeves type of drive will provide a high degree of adjustable speed constancy and accuracy for the shaft 49 for the advantages mentioned; but an even higher degree of constancy and accuracy of speed may be provided by a type of transmission between the shafts 52 and g1 comprising a double cone pulley arrangement similar to the Reeves drive but in which instead of a belt 77 there is a rigid metal ring running in metal-to-metal contact with the pulleys. Such devices are known commercially and the adjustable speed ratio of transmission from one cone pulley to another may be very accurately adjusted and will be very accurately maintained after adjustment, providing that the horsepower transmitted therethrough be kept down to a very low minimum; and the invention herein described adapts itself to such a device and with a corresponding high degree of constancy of speed, because in the arrangement herein described, the actual power transmitted between the shafts 52 and g1 is exceedingly small.

Figure 2:
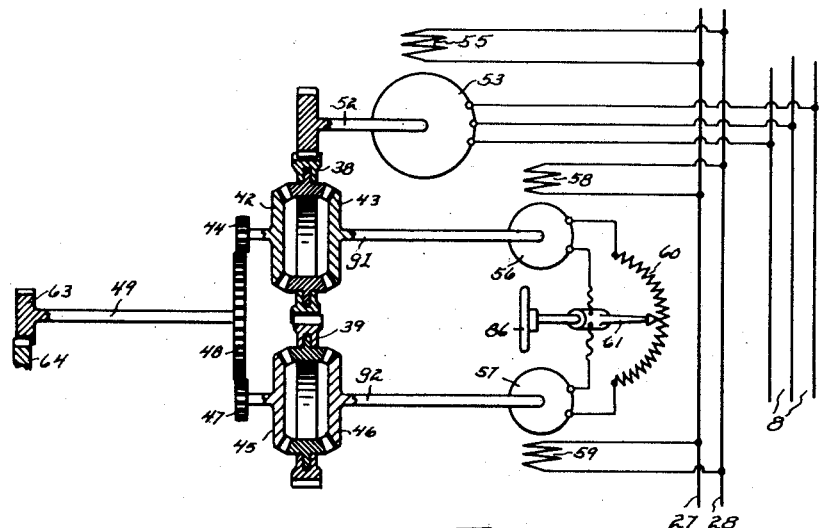
Fig. 2 is a view illustrating a part of the embodiment of Fig. 1 and illustrating a simplification which may be employed when a lesser degree of constancy of the load speed than that provided for in the embodiment of Fig. 1 is sufficient.

In the foregoing I have said that the adjustable speed ratio device 74 may be dispensed with when less than the maximum degree of accuracy of speed regulation is sufficient, and in order to make the matter clear this is shown in Fig. 2, and it is thought that description thereof is unnecessary since the parts illustrated are identified with those of Fig. 1 by the same reference characters.

Figure 3:
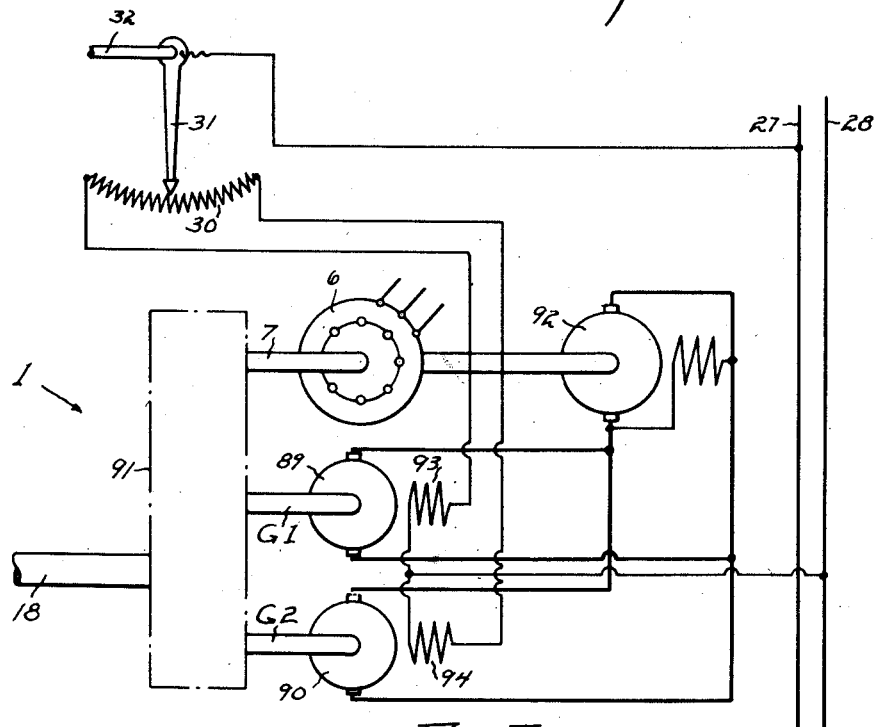
Figs. 3, 4 and 5 are views similar to a part of Fig. 1 illustrating modifications of a speed controller thereof.

As to the generators 19 and 20 of Fig. 1, it has been said that the preferred arrangement is to utilize for these generators alternating current induction generators, in association with units 21—22 on the shaft 7 having the construction of synchronous alternating current motors. In order to emphasize that this is not essential to the practice of my invention, I have shown in Fig. 3 a modification in which direct current generators 89 and 90 are used, driven by the shafts G1 and G2 of the differential mechanism 1, the gearing of which is indicated diagrammatically at 91 for simplicity; and these generators supply direct current in opposition, to a single direct current motor 92 on the main motor shaft 7. Electrical loads developed at the generators 89 and 90 control the relative speeds of the shafts G1 and G2 as described in the first form, and the power developed therein is transmitted back to the shaft 7 as before through the motor 92. Corresponding to the field windings 23 and 24 of the form of Fig. 1 are shunt windings 93 and 94 for the generators 89 and 90, and these are differentially energized from the supply mains 27 and 28 by the resistor 30; and by movement of the rheostat arm 31 thereover, for the purposes described in the first form. The shaft 32 for moving the rheostat arm 31 may be operated as in Fig. 1; with the end results described above for Fig. 1.

Figure 4:
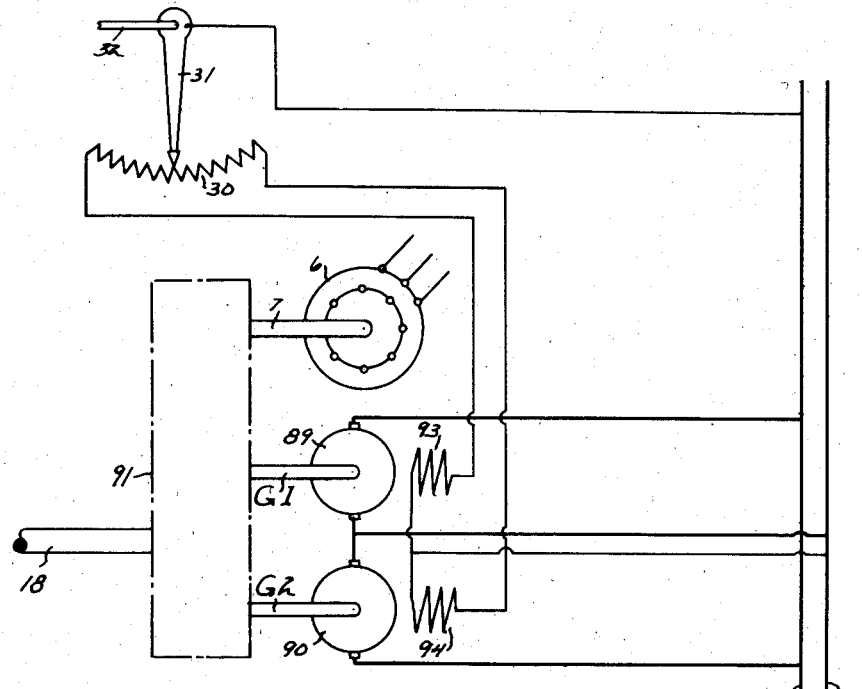
Figure 5:
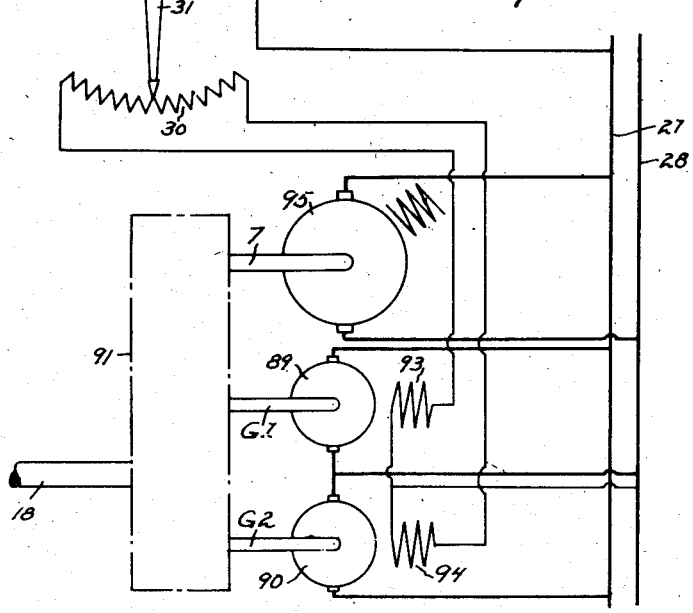

Again, while it has been described above as desirable that the power supplied to the generators on the shafts G1 and G2 be transmitted back to the power supplying shaft 7, this is not essential. In Figs. 4 and 5 it is shown that this power may be delivered back to the current supply mains. In Fig. 4 direct current generators 89 and 90 are shown as having their armatures connected, in opposition, to the direct current supply mains 27 and 28, and as having field windings 93 and 94 respectively the energization of which is controlled as was described in connection with Fig. 3 where similar generators are shown. Here again the power supplied to the generators from the G shafts is not lost, but is conserved.

In Fig. 5 a similar arrangement is shown, but a further conservation of power is effected by utilizing a main motor 95 on the shaft 7 supplied with current from the mains 27 and 28 to which current is supplied by the generators 89 and 90.

In the foregoing forms and modifications of my invention it is contemplated that the main load shaft 18 may be driven at adjustable constant speed in either the forward or reverse direction or brought to rest when desired. My invention is however applicable to uses in which only one direction of the main load shaft 18 is wanted and this is shown in Fig. 6.

Inasmuch as the same reference characters are here used as on corresponding parts of Fig. 1, the principal difference being in the use of fewer parts, it is believed that Fig. 7 will be understood if we go directly to a description of its operation.

The resistor 30 in this form has an off point 96, and the resistor 60 has an off point 97, and it will be assumed that at the start of operations the rheostat arms 31 and 61 are on these off points respectively.

The constant speed motor 53 is again rotating at full speed and by means of the gear 51 on its shaft 52 drives the spider 38, and the latter acting through the pinions 40—40 applies torque to the differential gears 42 and 43 tending to rotate the gear 44 and the shaft g1. The gear 44 is meshed with the gear 48 and therefore tends to rotate the shaft 49, the gear 63, the differential gear 64—65, the pinions 66 and the spider 67, and therefore the differential gear 44 requires a substantial torque to drive it. The shaft g1 however being connected only to the idly rotating armature of the motor 56 requires small torque to drive it. The torques supplied to the differential gears 42 and 43 are equal, but for the reasons just given the differential gear 42 will remain at rest and the differential gear 43 will rotate and rotate the shaft gI at twice the speed of the shaft 52.

The variable speed ratio transmission 74 has at this time an adjustment effected by the hand wheel 86 as described hereinbefore to cause the shaft 52 to tend to drive the shaft gI at this double speed.

The main power motor 6 driving the gear 5 and the spider 2 transmits torque through the pinions 9—9 to the gear 15 and the shaft GI, and similarly as above, since the rotor of the generator 19 rotates idly, the field winding 23 being unenergized, the main load shaft 18 remains at rest and the rotor of the generator 19 rotates at twice the speed as the spider 2.

To start the main load shaft 18 to rotating to cause it to come up to a pre-selected speed, the hand wheel 86 is turned through a selected angle to move the rheostat arm 61 to a selected point on the resistor 60. This puts electrical load on the generator 56, and greater torque on the shaft gI is required to drive it, and this greater torque, or the equal thereof, is supplied to the gear 44 and so on, and acting through the differential gearing 62 moves the rheostat 31 over the resistor 30 energizing the field winding 23, and developing electrical load at the generator 19, which develops torque in the shaft GI and a like torque at the gear 15, and the latter rotates the shaft 18. Rotation of the shaft 18 acting through the gear shaft 71 operates the differential mechanism 62 to slow down movement of, and to tend to restore, the rheostat arm 31, and to finally bring it to rest when the load shaft 18 attains the preselected speed. The regulating mechanism maintains this speed constant at the shaft 18.

Obviously the system of Fig. 6 may have the modification modes of operation illustrated by the above-described modifications of Figs. 2, 3, 4 and 5.

It is believed to be obvious that in either of the embodiments above described the speed at which the shaft 18 is driven may be selected; or varied; or terminated by the wheel 86.

In the foregoing forms and modifications of my invention, the regulated or preselected speed of the regulating shaft 49 is primarily determined by the relative loads of electric generators 56 and 57 as in Fig. 1 or of one generator 56 as in Fig. 6 and any slight variations in speed are ironed out or obviated by the variable speed ratio transmission 74. In some cases, the power necessary to drive the shaft 49 may be so small that the variable speed ratio transmission 74 alone may be employed and without the generators and it alone will maintain the shaft 49 accurately at a preselected speed, the transmission 74 in such cases being so small and of such low horsepower that it will operate efficiently at all adjusted speed ratios. Such an arrangement is illustrated in Fig. 7.

Here again the shaft 52 is driven by a constant speed motor 53 and a single differential gearing is used. One belt pulley, 75, of the transmission 74 is driven by the shaft 52 and the other pulley 76 is driven by the shaft gI connected to the differential gear 43, the spider 38 of which is driven by the shaft 52. The other differential gear 42 drives the shaft 49 through a pinion 44 and gear 48.

The pulleys 75 and 76 connected by the belt 77 are illustrated in Fig. 7 as of the same diameter and as having been adjusted to these relative diameters by the screw 84 upon turning the handle 86. With this adjustment, the differential gears 42 and 43 will rotate at the same speeds, this being the speed of the spider 38 and the gear 51 when the latter are of the same diameter as illustrated. The shaft 49 is thus driven say in a forward direction at a definite speed.

If the diameters of the pulleys 75 and 76 be changed to cause the pulley 75 to be larger than the pulley 76, the speed of the shaft 49 will decrease; and if the pulleys be changed until the pulley 75 be twice as large as the pulley 76 the shaft 49 will come to rest. On the other hand, if the pulleys be adjusted until the pulley 75 is of a diameter three times that of the pulley 76, the shaft 49 will rotate in the reverse direction and at a speed equal to the above mentioned definite forward speed.

Thus zero speed as well as any speed forward or reverse up to the maximum possible with the device 74 may be attained for the shaft 49 by adjusting the relative diameters of the pulleys 75 and 76 by the hand wheel 86.

Thus this control for the speed of the shaft 49 may be used with the apparatus described above where the load shaft 18 is to be rotated optionally in either the forward or the reverse direction; or it may be used with the form of Fig. 6 where the load shaft 18 is to rotate only in one direction.

My invention is not limited to the exact details of construction illustrated and described. Changes and modifications may be made within the spirit of my invention without sacrificing its advantages and my invention is comprehensive of all such modifications and changes which come within the scope of the appended claims.

For example, while I have illustrated and described differential gearing of the bevel gear type, it will be understood that the differential gearing may be of the planetary type.

And while I have shown certain mutually meshed gears as having certain diameter ratios, for convenience of description, it will be understood that they may have other ratios.

Also while I have shown the preferred constant speed arrangement at 37 for driving the shaft 49 at constant or selected speed, it will be understood that my invention in many of its aspects may be practiced with other constant speed arrangements for this purpose.

I claim:

1. A power apparatus for continuously driving a load at substantially constant speed by immediately correcting for deviations from that speed, comprising: a rotary load driving element; a continuously running rotary source of power; transmission mechanism through which power from the source is transmitted to the load driving element; controller means controlling the mechanism to control the speed of the load driving element; a first rotary means driven by and at a rotary speed corresponding to the speed of the load driving element; and a second rotary means driven by power at a constant preselected speed; differential means connecting the first and second rotary means to the controller means whereby the rotary movement of one rotary means is neutralized by the rotary movement of the other rotary means when the ratio of the speed of the first rotary means to that of the second rotary means is at a predetermined value; and the controller means being responsive to an increase or decrease of said ratio value effected by an increase or decrease of speed of the load driving element, above or below a predetermined speed, to restore the speed of the load driving element to said predetermined value and to thereby restore said ratio value; and means to adjustably change the predetermined speed of the load driving element, comprising means to adjustably change the preselected constant speed of the second rotary means.

2. A power apparatus for continuously driving a load at substantially constant speed by immediately correcting for deviations from that speed, comprising: a rotary load driving element; a continuously running rotary source of power; a differential gearing comprising three rotary gear elements, one gear element being driven by the power source, another gear element being connected to the load driving element; controller means controlling the speed of rotation of the third gear element to thereby control the speed of the load driving element; a rotary driven element driven by and at a speed corresponding to the speed of the load driving element; a rotary regulating element and means continuously rotating it at constant selected speed; differential means connecting the rotary driven element and the rotary regulating element to the controller means whereby the rotary movement of the driven element is neutralized by the rotary movement of the regulating element when their rotary speeds are at a predetermined ratio corresponding to a predetermined speed of the load driving element; and the controller means being responsive to a change of said ratio effected by a deviation of speed of the load driving element from said predetermined speed, to restore the speed of the load driving element to said predetermined speed and to thereby restore said ratio.

3. The power apparatus described in claim 2 and in which torque developing means is connected to the third gear element and the controller means controls the speed of the third gear element by controlling the amount of said torque.

4. A power apparatus for continuously driving a load at substantially constant speed comprising: a rotary load driving element; a continuously running rotary source of power; a differential gearing comprising three rotary gear elements, one gear element being driven by the power source, another gear element being connected to the load driving element; controller means comprising an electric generator connected to the third gear element and electro-magnetic winding means to control the load developed by the generator to thereby control the torque and speed of the third gear element and correspondingly the torque and speed of the load driving element; a rotary regulating element and means continuously rotating it at substantially constant selected speed; differential means connecting the rotary regulating element to the controller means and through which the rotary regulating element continuously tends to operate the controller means to change the energization of the winding to change the generator load to change the speed of the load driving element; and rotary means driven by the load driving element and acting through the differential means to continuously prevent said change so long as the load driven rotary means rotates at a predetermined speed, corresponding to said selected speed and whereby the load driving element causes the said energization to change upon a deviation of the load driving element from said predetermined speed, to restore it to said predetermined speed.

5. A power apparatus for driving a load at different preselected load speeds and for maintaining any preselected load speed substantially constant by immediately correcting for deviations therefrom, comprising: a main source of rotary power continuously running at substantially constant speed; a rotary load driving element; a main transmission mechanism transmitting power from the main power source to the load driving element; main controller means for controlling the main transmission mechanism to change the speed of the load driving element; a first rotary element driven at the speed of the load driving element; an auxiliary source of rotary power continuously running at a maintained constant speed; a second rotary element; an auxiliary transmission mechanism transmitting power from the auxiliary power source to the second rotary element to drive it at constant speed from the auxiliary power source; operator operable auxiliary controller means for controlling the auxiliary transmission mechanism to selectively change the constant speed of the second rotary element; intermediate mechanism through which both said rotary means act upon the main controller means and the action of one neutralizes that of the other when their rotary speeds are at a predetermined ratio; and the main controller means being responsive to a change of said ratio effected by a change of speed of the first rotary element caused by a deviation of speed of the load driving element from its preselected load speed, to restore the preselected load speed and thereby restore the said ratio; and being also responsive to a change of said ratio effected by a selected change of constant speed of the second rotary element, to change the speed of the load driving element to a selected load speed and to thereby restore said ratio.

6. A power apparatus for driving a load at different preselected load speeds and for maintaining any reselected load speed substantially constant by immediately correcting for deviations therefrom, comprising: a main source of rotary power continuously running at substantially constant speed; a rotary load driving element; a main transmission mechanism comprising differential gearing transmitting power from the main power source to the load driving element; main controller means for controlling the main transmission mechanism to change the speed of the load driving element; a first rotary element driven at the speed of the load driving element; an auxiliary source of rotary power continuously running at a maintained constant speed; a second rotary element; an auxiliary transmission mechanism comprising differential gearing transmitting power from the auxiliary power source to the second rotary element to drive it at constant speed from the auxiliary power source; operator operable auxiliary controller means for controlling the auxiliary transmission mechanism to selectively change the constant speed of the second rotary element; intermediate mechanism comprising differential gearing through which both said rotary means act upon the main controller means and the action of one neutralizes that of the other when their rotary speeds are at a predetermined ratio; and the main controller means being responsive to a change of said ratio effected by a change of speed of the first rotary element caused by a deviation of speed of the load driving element from its preselected load speed, to restore the preselected load speed and thereby restore the said ratio; and being also responsive to a change of said ratio effected by a selected change of constant speed of the second rotary element, to change the speed of the load driving element to a selected load speed and to thereby restore said ratio.

7. A power apparatus for driving a load in either forward or reverse direction, and at different preselected load speeds and for maintaining any preselected load speed substantially constant by immediately correcting for deviations therefrom, comprising: a main source of rotary power continuously running at substantially constant speed; a rotary load driving element; a main transmission mechanism transmitting power from the main power source to the load driving element; main controller means for controlling the main transmission mechanism to change the direction and the speed of the load driving element; a first rotary element driven at the speed of and in a direction corresponding to that of the load driving element; an auxiliary source of rotary power continuously running at a maintained constant speed; a second rotary element; an auxiliary transmission mechanism transmitting power from the auxiliary power source to the second rotary element to drive it at constant speed from the auxiliary power source; operator operable auxiliary controller means for controlling the auxiliary transmission mechanism to selectively change the direction of rotation of the second rotary element, and to selectively change its constant speed in either direction; intermediate mechanism through which both said rotary means act upon the main controller means and the action of one neutralizes that of the other when their rotary speeds are at a predetermined ratio and in predetermined relative directions; and the main controller means being responsive to a change of said ratio effected by a change of speed of the first rotary element caused by a deviation of speed of the load driving element from its preselected load speed, to restore the preselected load speed and thereby restore the said ratio; and being also responsive to a change of said ratio effected by a selected change of constant speed of the second rotary element, to change the speed of the load driving element to a selected load speed and to thereby restore said ratio; and also being responsive to a selective change of direction of the second rotary element, to change the direction of the load driving element, and to thereby restore said ratio, and said predetermined relative directions of rotation of the first and second rotary elements.

8. A power apparatus for driving a load in either forward or reverse direction, and at different preselected load speeds and for maintaining any preselected load speed substantially constant by immediately correcting for deviations therefrom, comprising: a main source of rotary power continuously running at substantially constant speed; a rotary load driving element; a main transmission mechanism comprising differential gearing transmitting power from the main power source to the load driving element; main controller means for controlling the main transmission mechanism to change the direction and the speed of the load driving element; a first rotary element driven at the speed of and in a direction corresponding to that of the load driving element; an auxiliary source of rotary power continuously running at a maintained constant speed; a second rotary element; an auxiliary transmission mechanism comprising differential gearing transmitting power from the auxiliary power source to the second rotary element to drive it at constant speed from the auxiliary power source; operator operable auxiliary controller means for controlling the auxiliary transmission mechanism to selectively change the direction of rotation of the second rotary element, and to selectively change its constant speed in either direction; intermediate mechanism comprising differential gearing through which both said rotary means act upon the main controller means and the action of one neutralizes that of the other when their rotary speeds are at a predetermined ratio and in predetermined relative directions; and the main controller means being responsive to a change of said ratio effected by a change of speed of the first rotary element caused by a deviation of speed of the load driving element from its preselected load speed, to restore the preselected load speed and thereby restore the said ratio; and being also responsive to a change of said ratio effected by a selected change of constant speed of the second rotary element, to change the speed of the load driving element to a selected load speed and to thereby restore said ratio; and also being responsive to a selective change of direction of the second rotary element, to change the direction of the load driving element, and to thereby restore said ratio, and said predetermined relative directions of rotation of the first and second rotary elements.

LEV A. TROFIMOV.

REFERENCES CITED

The following references are of record in the file of this patent:

UNITED STATES PATENTS

| Number | Name | Date |
|---|---|---|
| 1,909,137 | Thompson | May 16, 1933 |
| 1,669,107 | Umonsky | May 8, 1928 |
| 1,881,011 | Wittkuhns | Oct. 4, 1932 |
| 1,122,942 | Kaminski | Dec. 29, 1914 |

FOREIGN PATENTS

| Number | Country | Date |
|---|---|---|
| 558,334 | France | May 23, 1923 |